ns561B2" />

(12) United States Patent
Kossowan

(10) Patent No.: US 7,915,561 B2
(45) Date of Patent: Mar. 29, 2011

(54) APPARATUS FOR COATING A PIPE SURFACE

(75) Inventor: Barry Kossowan, Edmonton (CA)

(73) Assignee: Matrix Wear Technologies Inc., Sherwood Park, AB (CA)

( * ) Notice: Subject to any disclaimer, the term of this patent is extended or adjusted under 35 U.S.C. 154(b) by 985 days.

(21) Appl. No.: 11/675,794

(22) Filed: Feb. 16, 2007

(65) Prior Publication Data

US 2008/0073328 A1  Mar. 27, 2008

Related U.S. Application Data

(60) Provisional application No. 60/826,936, filed on Sep. 26, 2006.

(51) Int. Cl.
*B23K 9/04* (2006.01)
*B05C 7/02* (2006.01)

(52) U.S. Cl. .............. 219/76.14; 219/61.1; 219/137.31; 118/215; 118/306; 118/317

(58) Field of Classification Search ............. 219/61.1, 219/76.14, 137.31, 137.7; 118/215, 306, 118/317
See application file for complete search history.

(56) References Cited

U.S. PATENT DOCUMENTS

| 4,513,443 A | | 4/1985 | Louttit |
| 4,988,215 A | * | 1/1991 | Osawa ............................ 384/44 |
| 5,362,962 A | * | 11/1994 | Barborak et al. ............. 250/234 |
| 6,171,389 B1 | | 1/2001 | Anderson |
| 6,274,845 B1 | * | 8/2001 | Stava et al. ............... 219/125.12 |
| 2002/0007548 A1 | * | 1/2002 | Stoewer et al. ............ 29/525.06 |

FOREIGN PATENT DOCUMENTS

| CA | 2302083 | | 10/2000 |
| JP | 06142930 A | * | 5/1994 |

* cited by examiner

*Primary Examiner* — Stephen J Ralis
(74) *Attorney, Agent, or Firm* — Adrian D. Battison; Ade & Company Inc.

(57) ABSTRACT

A wear resistant coating is applied on an elbow or S-bend by weld beads applied along a pipe. A rectangular support rod is attached inside the pipe by connectors so that wheels of the carriage are guided on the corners to maintain a fixed orientation relative to the support rod. A three axis robot arm carries an electric welding head so as to be able to dynamically adjust the head both angularly and radially. A welding wire is pulled to the head by a feeding system on the carriage. The weld parameters including a predetermined wire stick out and angle of wire attack are controlled. A drive motor carried by a drive carriage propels the drive carriage longitudinally along the support rod with a series of intermediate carriages.

16 Claims, 6 Drawing Sheets

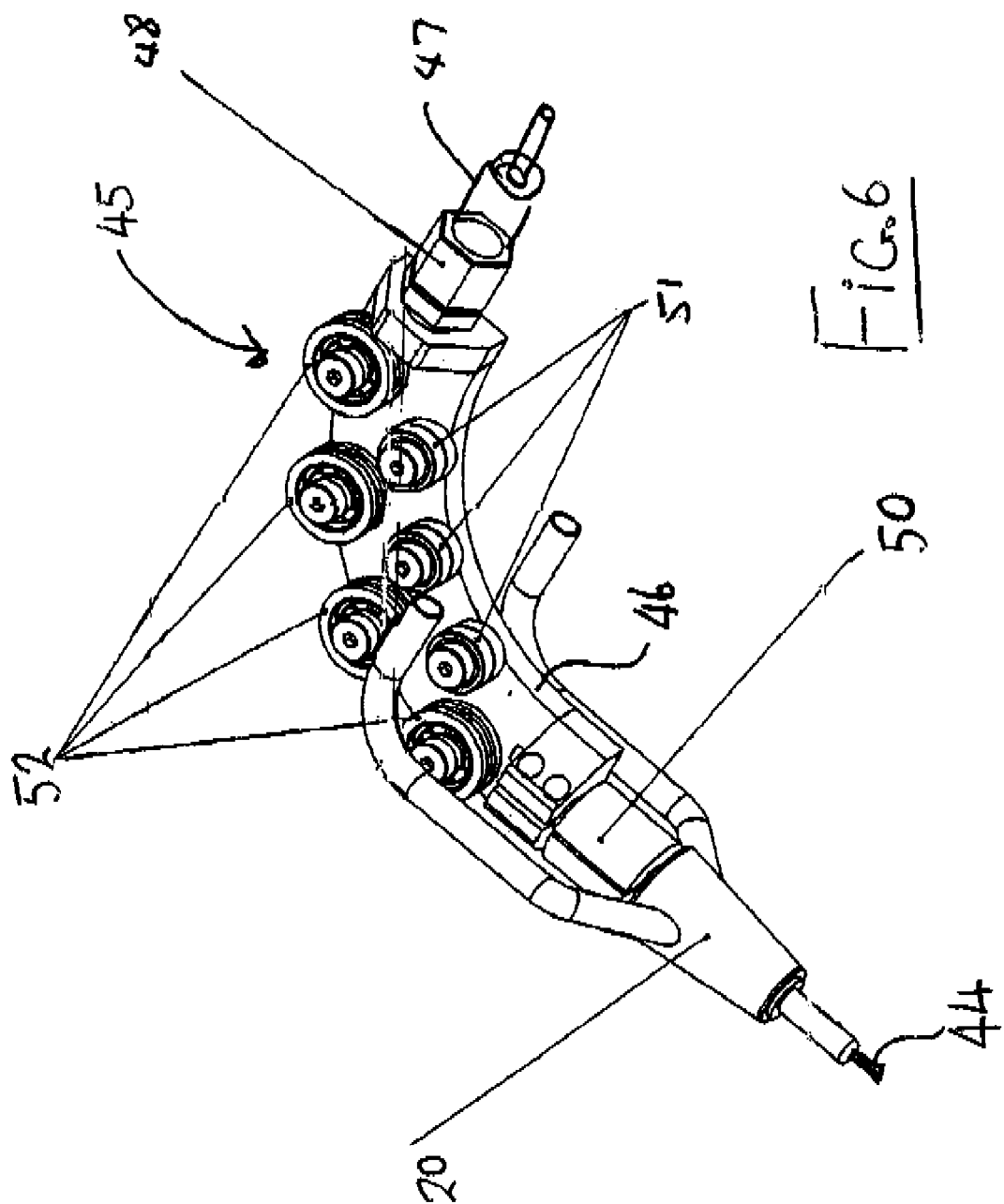

APPARATUS FOR COATING A PIPE SURFACE

This application claims the benefit under 35 U.S.C. 119 of the filing date of Provisional Application Ser. No. 60/826,936 filed Sep. 26th 2006.

The present invention relates generally to the field of apparatus for coating an inside surface of a pipe.

BACKGROUND OF THE INVENTION

Pipes are often used to carry fluids or abrasive slurries as part of a treatment or disposal process. As the fluid passes through the pipe, frictional forces against the pipe walls can cause the pipe walls to wear. The effect of these frictional forces is magnified on the curved portions of the pipe as a result of complex flow patterns and the forces from the fluid impacting the pipe surface caused by the fluid changing direction. Abrasives suspended within the fluid (e.g. solids commonly associated with mining slurries or sludge) can be even more detrimental to the pipe walls. Whatever the cause, these forces cause the pipe walls to wear even faster, is eventually causing the pipe walls to crack or burst where the walls have worn thin.

To minimize the effects of these frictional forces on the pipe walls, a protective coating is applied (e.g., welded or sprayed) to the inner surface of the pipe. To provide effective protection against wear on the pipe wall, it is important that the entire area is completely coated with the coating material. Areas left unprotected will continue to be vulnerable to fracture.

A prior patent owned by the present Applicants which is U.S. Pat. No. 6,171,389 which corresponds to Canadian Patent Application 2,302,083 (Hannu) published Oct. 12th 2000 discloses an apparatus for coating an interior surface of a pipe which has a support rod with a substantially square cross section that extends axially along the interior surface of the pipe. An index carriage slidably engages the substantially square cross section of the support rod so that the index carriage maintains a fixed rotational orientation relative to the support rod. An index motor having a variable index position is carried by the index carriage. An electric welding head for coating the interior surface of the pipe with weld material is rotatably attached to the index carriage and connected to the index motor. As such the head has an elevation position that corresponds to the index position of the index motor. A drive motor carried by a drive carriage propels the drive carriage longitudinally along the support rod. The drive carriage and the index carriage form a train with a series of intermediate carriages that slidably engage the substantially square cross section of the support rod to move longitudinally along the support rod The welding torch applies an abrasion resistant surfacing such as tungsten carbide to the interior wear surfaces of large industrial pipe elbows and S-bends. The abrasion resistant surface is essentially formed through a welding process where layer after layer of weld beads are applied to the pipe in the axial direction.

A machine has been built and used extensively based on this patent and has achieved considerable commercial success. It does however have a number of areas where problems can arise and where improvements are desirable. On this machine, the tracking bar is unsupported over the free length that the welding torch travels. This limits the travel distance because as the unsupported length of the bar is increased oscillation and deflection problems are encountered. Presently the maximum travel distance is 11 feet.

Instability in the support system can create two main obstacles to fast, efficient welding of the pipe elbows and S-bends. First is the droop of the guidance bar in the center of the pipe. This droop hinders the ability of the welder to complete a straight and even path through the pipe. Furthermore, the larger the bend radius of the pipe, the greater the effect of droop has on the quality of the welds.

A second area of concern is with respect to the unwanted oscillatory motion that can develop in the guidance bar. Clearly this affects the ability to produce a straight, even and acceptable weld.

The current welding set-up is in some cases not stable enough to reliably produce fast and accurate welds in both directions of travel. Instability can develop into an unintended oscillating motion of the welding head that is entirely incompatible with the welding process used to layer the pipe. Due to the instability of the guiding system the operators generally can weld in one direction only. This combined with difficulty to rapidly return to the starting weld position can dramatically affect the welding cycle time.

Within a welding environment there come a number of challenges. First is temperature, expected to range between 250 and 450 degrees Fahrenheit. In addition to temperature, welding smoke, ultraviolet light and weld splatter must all be taken into consideration.

Another prior example of the prior art in this field is disclosed in U.S. Pat. No. 4,513,443 (Kostecki). Kostecki discloses an apparatus for coating an internal wall of a curved pipe with a layer of protective material. The apparatus has a guide means, a longitudinally flexible member, means for applying a coating, means for incremental rotation by the longitudinally flexible member, a drive means to drive the longitudinally flexible member relative to the curved pipe, and a means to automatically step the flexible member and consequently rotate the coating means. However, a disadvantage of using the flexible member in Kostecki is the associated inaccuracy in translating the rotational steps along the longitudinally flexible member. Because the coating means cannot be accurately rotated, the protective material can be misapplied resulting in either gaps or overlap between the applied strips of protective material.

SUMMARY OF THE INVENTION

It is one object of the present invention to provide a modified apparatus of the above general type which may overcome one or more of the above problems of the above machines.

According to a first aspect of the present invention there is provided an apparatus for coating an interior surface of a pipe, said apparatus comprising:

a support rod arranged to extend along the interior of the pipe at a position at or parallel to a longitudinal axis of the pipe;

an operating carriage mounted on the support rod for movement therealong;

the support rod and the operating carriage having cooperating elements which maintain the operating carriage at a fixed rotational orientation relative to said support rod;

a coating head for coating the interior surface of the pipe from a supply of a coating material;

a head drive system carried by the operating carriage for moving the coating head relative to the operating carriage in directions both angularly around and radially of the support rod; and a carriage drive system for driving the operating carriage longitudinally along said support rod;

wherein the head drive system comprises a multi-axis robotic arm able to dynamically adjust the head relative to the operating carriage both angularly and radially.

Preferably the head drive system is PLC controlled.

Preferably the head is an electrical welding head although other coating systems can be used. Where a welding head is used, the head drive system preferably maintains a preset electrical stick-out relative to the pipe surface as the distance of the surface from the carriage varies.

Preferably the head drive system maintains a preset electrical stick-out by detecting variations in welding parameters.

Preferably the head is an electrical welding head and wherein there is provided a control system for controlling the head drive system and the carriage drive system able to program in all welding parameters including wire feed speed, amperage, arc voltage, torch travel speed, electrical stick-out and bead overlap.

Preferably the support rod is carried within the pipe by at least one connection member connected between the rod and the pipe.

Preferably the at least one connection member comprises a series of pre-cut spacer straps.

Preferably the multi-axis robotic arm comprises a three parallel axis system including a shoulder axis connected to the carriage, an elbow axis and a wrist axis connected to the head with a pair of arms between the shoulder axis and the elbow axis and between the elbow axis and the wrist axis.

Preferably the shoulder pivot axis is located in the center of the pipe to allow for smooth, easy, and accurate angular placement of the head.

Preferably the support rod is square or rectangular and the carriage includes guide wheels supporting the carriage on the corners of the support rod.

Preferably the guide wheels are arranged in opposed pairs at the front and rear of the carriage.

Preferably the head is an electrical welding head and a wire feeder is mounted just behind the head, therefore minimizing the distance over which the wire is pushed to the head.

Preferably the head is an electrical welding head and a wire feeder is pull style wire feeder located as close to the welding head as possible.

Preferably the wire feeder includes roller wire guides at the angle transition between the head which extends radially and an axially extending liner.

According to a second aspect of the present invention there is provided an apparatus for coating an interior surface of a pipe, said apparatus comprising:

a support rod arranged to extend along the interior of the pipe at a position at or parallel to a longitudinal axis of the pipe;

an operating carriage mounted on the support rod for movement therealong;

the support rod and the operating carriage having cooperating elements which maintain the operating carriage at a fixed rotational orientation relative to said support rod;

a coating head for coating the interior surface of the pipe from a supply of a coating material;

a head drive system carried by the operating carriage for moving the coating head relative to the operating carriage in directions both angularly around and radially of the support rod; and a carriage drive system for driving the operating carriage longitudinally along said support rod;

wherein the head is an electrical welding head and the head drive system maintains a preset electrical stick-out relative to the pipe surface as the distance of the surface from the carriage varies.

According to a third aspect of the present invention there is provided an apparatus for coating an interior surface of a pipe, said apparatus comprising:

a support rod arranged to extend along the interior of the pipe at a position at or parallel to a longitudinal axis of the pipe;

an operating carriage mounted on the support rod for movement therealong;

the support rod and the operating carriage having cooperating elements which maintain the operating carriage at a fixed rotational orientation relative to said support rod;

a coating head for coating the interior surface of the pipe from a supply of a coating material;

a head drive system carried by the operating carriage for moving the coating head relative to the operating carriage in directions both angularly around and radially of the support rod; and a carriage drive system for driving the operating carriage longitudinally along said support rod;

wherein the head is an electrical welding head and wherein there is provided a control system for controlling the head drive system and the carriage drive system able to program in all welding parameters including wire feed speed, amperage, arc voltage, torch travel speed, electrical stick-out and bead overlap.

According to a fourth aspect of the present invention there is provided an apparatus for coating an interior surface of a pipe, said apparatus comprising:

a support rod arranged to extend along the interior of the pipe at a position at or parallel to a longitudinal axis of the pipe;

an operating carriage mounted on the support rod for movement therealong;

the support rod and the operating carriage having cooperating elements which maintain the operating carriage at a fixed rotational orientation relative to said support rod;

a coating head for coating the interior surface of the pipe from a supply of a coating material;

a head drive system carried by the operating carriage for moving the coating head relative to the operating carriage in directions both angularly around and radially of the support rod; and a carriage drive system for driving the operating carriage longitudinally along said support rod;

wherein the support rod is carried within the pipe by at least one connection member connected between the rod and the pipe.

According to a fifth aspect of the present invention there is provided an apparatus for coating an interior surface of a pipe, said apparatus comprising:

a support rod arranged to extend along the interior of the pipe at a position at or parallel to a longitudinal axis of the pipe;

an operating carriage mounted on the support rod for movement therealong;

the support rod and the operating carriage having cooperating elements which maintain the operating carriage at a fixed rotational orientation relative to said support rod;

a coating head for coating the interior surface of the pipe from a supply of a coating material;

a head drive system carried by the operating carriage for moving the coating head relative to the operating carriage in directions both angularly around and radially of the support rod; and a carriage drive system for driving the operating carriage longitudinally along said support rod;

wherein the carriages include guide wheels supporting the carriages on the corners of the support rod.

According to a sixth aspect of the present invention there is provided an apparatus for coating an interior surface of a pipe, said apparatus comprising:

a support rod arranged to extend along the interior of the pipe at a position at or parallel to a longitudinal axis of the pipe;

an operating carriage mounted on the support rod for movement therealong;

the support rod and the operating carriage having cooperating elements which maintain the operating carriage at a fixed rotational orientation relative to said support rod;

a coating head for coating the interior surface of the pipe from a supply of a coating material;

a head drive system carried by the operating carriage for moving the coating head relative to the operating carriage in directions both angularly around and radially of the support rod; and a carriage drive system for driving the operating carriage longitudinally along said support rod;

wherein the head is an electrical welding head and a wire feeder is mounted just behind the head, therefore minimizing the distance over which the wire is pushed to the head.

According to a seventh aspect of the present invention there is provided an apparatus for coating an interior surface of a pipe, said apparatus comprising:

a support rod arranged to extend along the interior of the pipe at a position at or parallel to a longitudinal axis of the pipe;

an operating carriage mounted on the support rod for movement therealong;

the support rod and the operating carriage having cooperating elements which maintain the operating carriage at a fixed rotational orientation relative to said support rod;

a coating head for coating the interior surface of the pipe from a supply of a coating material;

a head drive system carried by the operating carriage for moving the coating head relative to the operating carriage in directions both angularly around and radially of the support rod; and a carriage drive system for driving the operating carriage longitudinally along said support rod;

wherein there is provided a control system for controlling an angle of attack of the coating head in a radial plane of the axis relative to a line radial to the axis;

and wherein the control system is arranged such that the angle of attack is changed at different positions around the axis.

The welding cycle time; defined as the portion of time spent welding versus time spent in set-up and adjustments to the machine may be increased significantly in order to dramatically improve production.

It is desirable for the machine to process pipes ranging from 17 inch inside diameter to 47 inch inside diameter and be capable of full length welding of a 30" 5D90 pipe with a 24 foot center line length and welding an 18" 3D90 pipe with 54" center line radius.

In addition to welding elbow pipes and S-bends, it is desirable that the machine be capable of welding straight pipes and concentric reducers with a circumferential weld pattern.

Weld parameters may provide a wire speed up to 220 inches per minute at 29-32 volts and 600 amps, This is based off of a 7/64 wire diameter, welding with 0.75 inch to 1.5 inch of electrical stick-out, Welding travel speed may be set at a maximum of 65 inches per minute. The welding head is generally orientated at 90 degrees to the direction of travel and at an angle of attack of 15 degrees with respect to the previous weld bead but this can be varied.

The ability to weld on each side of the pipe without the need to remove and reattach the welding head is another desirable feature that will allow for increased cycle times and versatility. The welding head may be liquid cooled and a shroud to cover the support bar from weld splatter may also be provided.

The arrangement described hereinafter provides a four axis torch positioning system with weld tracking capabilities. The carriage rides along the guide rod and supports a three axis manipulator arm. The arm may allow for precise positioning of the torch along the weld path at any position within the lower 180 degrees of the pipe. After this the system is inverted to coat the top half.

Weld tracking feedback may be provided to allow the arm to guide itself in order to follow the path of previous weld beads.

Welding in both directions of travel is the ideal solution to increase cycle time and the arrangement described hereinafter may have this ability. The arrangement described hereinafter uses a tie rod cart system which may include the ability to rapidly return to the starting position for improved cycle times if two directional welding is not feasible in general or applicable to a particular job.

The carriage preferably rides on the corners of the bar and not on the flats of the bar to produce a more stable carriage with good acceptance for tracking around bends.

The guide bar is preferably supported on one or more straps along its length extending from the bar to the inside surface of the pipe to help combat the issues associated with the droop of the bar. By supporting the guide bar, the droop can be reduced significantly, and the moment effects created by larger bend radius pipes may be eliminated. The oscillatory effects may also be significantly reduced with the addition of the strap support as the free length of the bar is reduced and the system is stiffened.

The support strap or straps can simply be tack welded to the guide bar and to the top of the pipe provided that the pipe is large enough to facilitate a manual welder. The carriage may have a slot to incorporate clearance for this support strap to pass as the welding assembly passes through the midpoint of the is pipe. In situations where a manual tack joint is not possible an alternate method may be required if the levels of droop or oscillation are found to be unacceptable.

One possible alternative in controlling the droop and oscillatory movements of the bar is to use a pre-cambered bar, or camber a bar in the pipe by manipulating the end supports. An air cylinder or jack screw can then be connected to the center of the bar and use it to apply pressure to the top of the pipe. This force may act against the cambered bar to produce a more rigid and stiff support of the guidance bar.

The final point of concern with respect to the guidance bar stability deals with the bars end supports. The end supports may be designed to allow for a rigid clamping of the guide bars yet allowing ease of adjustment for alignment purposes. In addition to the above requirement the ability to induce camber into the bar may provide a comfortable degree of flexibility. The connection between the guide bar and the in-feed bar may need to be fortified to ensure a rigid connection, especially if a camber is to be introduced through it.

A four axis manipulator arm and weld tracking system ensures that any complications that may arise from the guide bar droop or misalignment or out of round pipe can be easily corrected through automatic adjustment of the welding head. The arm may be adjusted by detecting the weld parameters primarily the current draw which indicates the distance of the torch tip from the pipe surface.

One option is to provide a system for tracking previous weld bead by which the manipulator arm can ensure that following welds remain straight and in-line with the initial weld bead. This in conjunction with the above mentioned improvements to the guide bar system will produce a uniform and complete weld pattern on the interior surface of the pipe.

As is well known, the pipe bending process often creates pipes with oval diameters in the bent section of the pipes as opposed to the true round diameter of the pipe outside bent sections. This creates difficulties for welding set-ups that incorporate fixed stick-out settings as the deviation in diameter through the bend section of the pipe can often be outside the acceptable variation in allowed stick-out.

The arrangement described herein provides a four axis torch manipulator arm able to dynamically adjust the torch position and thus maintain proper stick-out parameters despite variations in pipe diameter along the direction of travel. System stick-out will need to be monitored in real time in order to provide adequate feedback to the manipulator arm to allow it to adjust accordingly. A number of options are available to monitor stick-out, including optics, laser scanning and weld voltage or current monitoring. The arrangement described hereinafter may incorporate stick-out monitoring into the weld tracking capabilities of the control system.

The arrangement described herein uses push style wire feeders mounted on the carriages outside the pipe to reduce the size and weight of the components that the guide bar must support. A pull style wire feeder can be used to reduce liner wear significantly by simply placing the wire in tension and thus reducing outward force on the liner. This requires a relatively light wire feeder of relatively small physical size.

In order to reduce wear on the liners at the torch the arrangement described herein may incorporate a water cooled torch with a robust wire guiding system.

The arrangement described herein uses a welding head manipulator arm which is attached to the support carriage that is designed specifically to ride along the guidance bar. Three independent axes of control allow for precise angular and radial positioning anywhere within the bottom 180 degrees of the pipe. Each axis uses a dedicated servo-motor and gearbox sized accordingly to accommodate anticipated payloads.

One servo-motor and gearbox is located at the "shoulder" of the arm and used to provide course angular positioning of the welding head tip. Another servo-motor gearbox combination is located at the "elbow" of the arm and works in conjunction with the shoulder motor to provide fine angular positioning as well as radial positioning. At the "wrist" of the arm the final servo-motor and gearbox provides precise welding head angle adjustment for the varying locations within the pipe.

With intelligent control of these three axes the welding head is able to be positioned accurately anywhere within the bottom 180 degrees of the pipe with no mechanical adjustments required. This allows the operators to weld and switch between either side of the pipe effortlessly.

The range of motion may be limited making it necessary to use different upper arms lengths to incorporate the entire range of pipe diameters that the machine must be able to work with. Three different length arms may be interchangeable in a manner that will allow for a fast, accurate, and repeatable swap of components. One arm may be used for pipes with inside diameters between 17 and 27 inches. Another may be used for pipes with inside diameters ranging from 27 to 37 inches and the final arm for pipes with inside diameters between 37 and 47 inches. Care may be taken to center the shoulder pivot point in the center of the pipe to allow for smooth, easy, and accurate angular placement of the welding head.

The carriage case may need to be open along the top to allow the middle guide bar support to pass unobstructed. This opening may be sealed through the use of brushes to allow the incorporation of some positive air pressure to help combat contamination of the rolling elements. The design may include a support mount for the manipulator arm as well as connections for the tie rod push mechanism.

BRIEF DESCRIPTION OF THE DRAWINGS

The present invention can be more readily understood in conjunction with the accompanying drawings, in which:

FIG. 6 is an isometric view of the welding torch and wire feed of FIG. 3.

DETAILED DESCRIPTION

Figure 1:
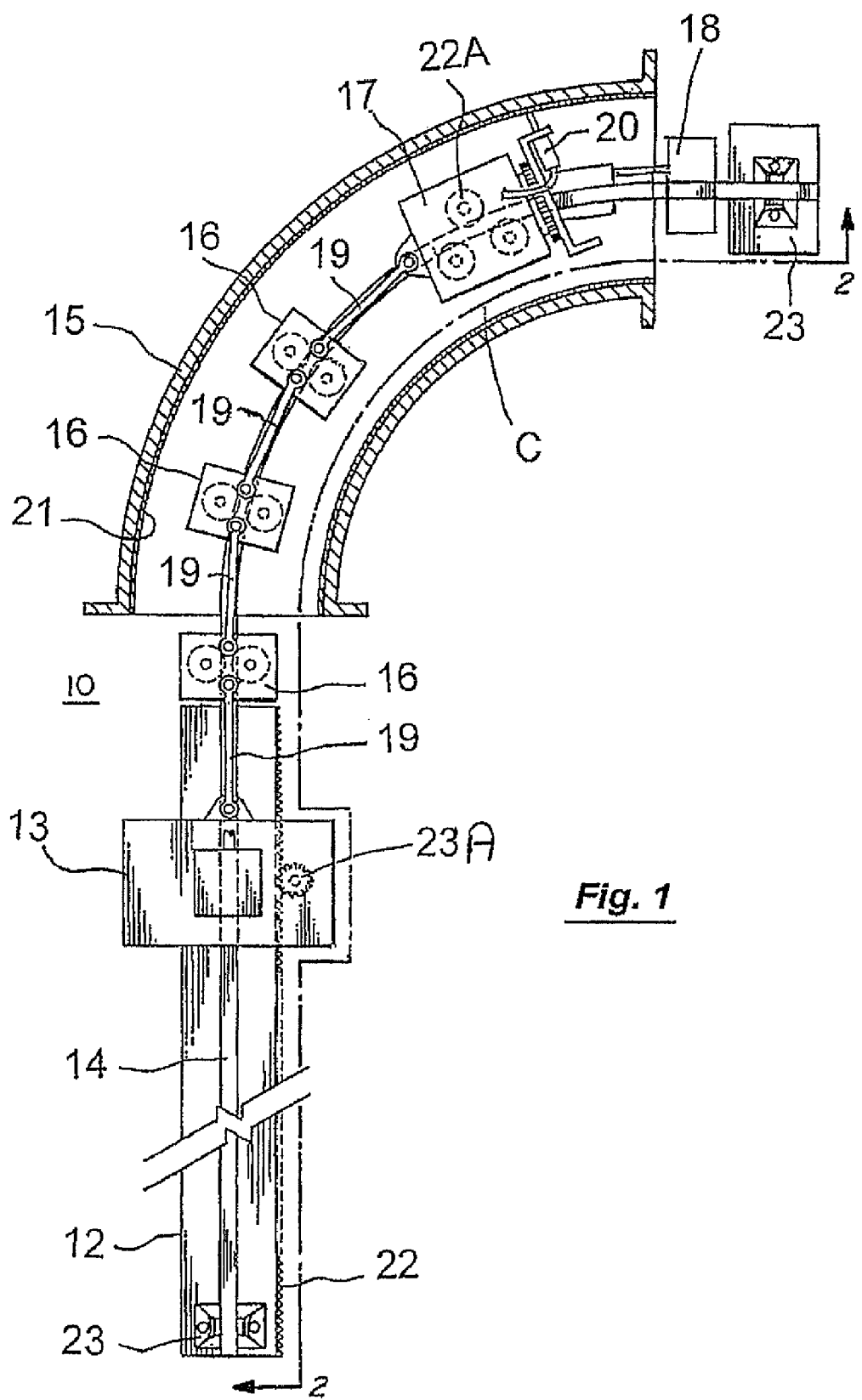
FIG. 1 is a top plan view of an apparatus showing the type of machine with which the present invention is concerned and showing the pipe in cross section.
Figure 2:
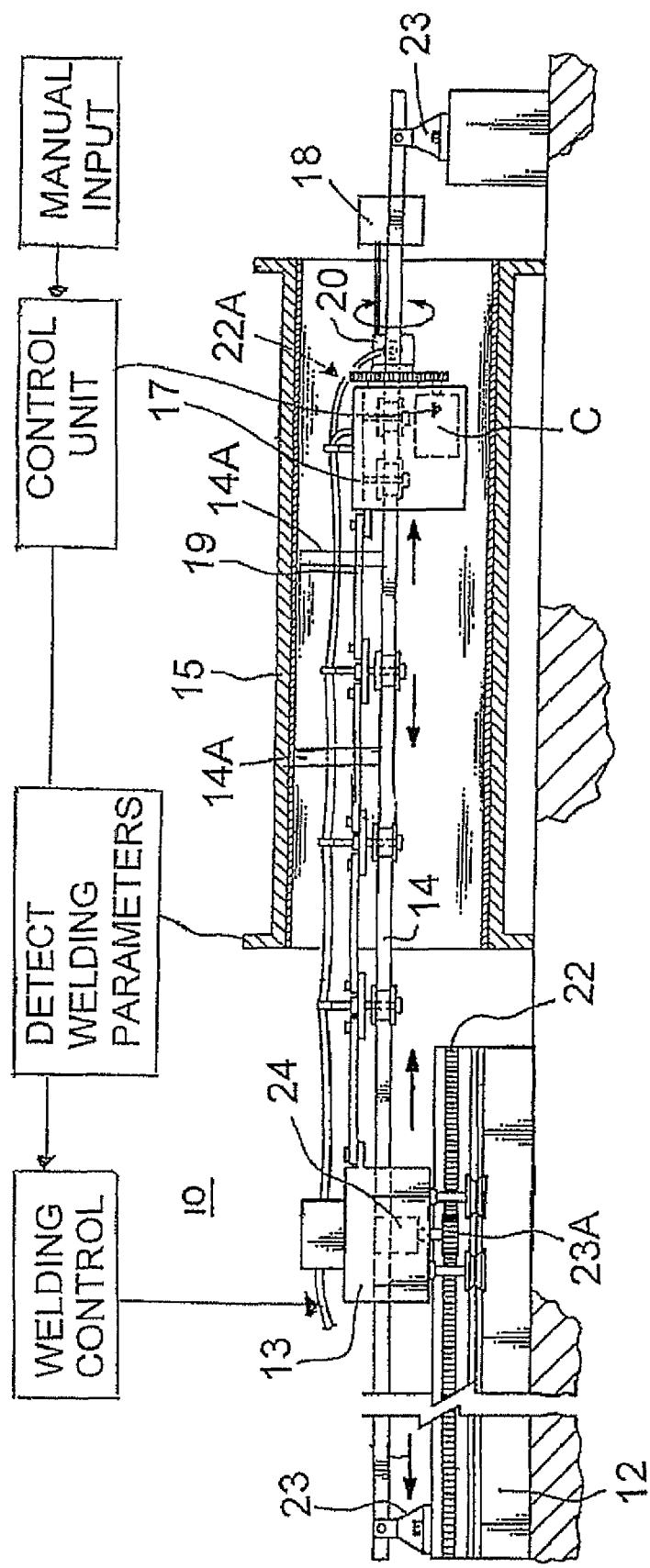
FIG. 2 is a side cross sectional view taken along lines 2-2 of FIG. 1.

An apparatus 10 is shown in FIGS. 1 and 2 and includes a frame 12 supports a drive carriage 13 and a support rod 14. The support rod 14 extends along the length of the frame 12 and beyond the frame 12 above the floor on which the frame stands so that the support rod 14 can be extended through a pipe 15 generally parallel to the axis of the pipe. In FIG. 1, three intermediate carriages 16 and an operating carriage 17 are shown for movement along the support rod 14.

An additional support carriage 18 is provided in advance of the operating carriage 17 to provide support for components of the system including control cables and other elements as required which are to be supported at a position spaced from the operating carriage so as to keep them away from the operating components as described hereinafter.

Figure 5:
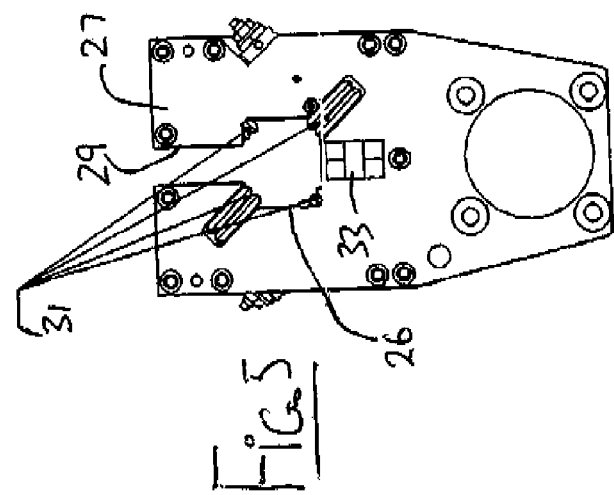
FIG. 5 is a front elevational view of the frame of FIG. 4.

The support rod 14 is shaped to provide support for the carriages as a train of carriages so that each carriage travels longitudinally along the support rod 14 in a fixed orientation relative to the support rod 14. For example, the support rod 14 can have a square cross section so as to co-operate with a square receptacle on each of the carriages as shown in FIG. 5. The intermediate carriages are connected to one another between the drive carriage 13 and the operating carriage 17 with tie rods.

A coating head 20 which is preferably a welding head, but could in other embodiments be a sprayer, nozzle, etc., or even a cleaning device such as a brush, is rotationally attached to the operating carriage 17 for movement therewith. Thus, when the drive carriage 13 is driven the length of the frame 12, as described in more detail below. The intermediate carriages and the operating carriage, move along the support rod 14 axially through the pipe 15. As the operating carriage is moved along the support rod 14, the coating head 20 applies a strip of protective coating to the inner wall 21 of the pipe 15 along the pipe.

The coating head 20 is mounted on the operating carriage 17 by a head drive system 22A, at the end of each longitudinal pass, the head drive system is activated to rotate the coating head 20 around the axis of the pipe to a new angular orientation, as described in more detail below, and another strip of protective coating is applied to the inner wall 21 of the pipe 15 as the operating carriage is moved along the support rod 14 by the drive carriage 13.

The frame 12 carries a rack 22 which co-operates with a gear 23A driven by a motor 24 on the drive carriage 13 so that operation of the motor acts to drive the drive carriage along the frame to force the operating carriage through the tie rods and the intermediate carriages to enter into and to pass through the pipe in a coating action. Coating can take place in one direction of movement or in both depending on stability and dimensions of the apparatus. Each coating action is followed by an angular adjustment of the coating head to apply another strip of the coating material.

The frame 12 is preferably straight and the rack 22 extends for a length at least equal to the length of the pipe 15 that is to be coated. Thus the entire length of the pipe 15 that is to be coated can be coated when the drive carriage 13 travels the length of the rack 22.

The support rod 14 is preferably securely fastened above the frame 12 to a support bracket 23 mounted on the frame 12. The support rod 14 can also be fastened using a second support bracket 23 mounted above the floor at the opposite end.

In operation, each of the above described components of the apparatus 10 preferably inter-act in the following manner. Typically, the drive carriage 13 will alternately move between a fully retracted position and a fully extended position. That is, when the drive carriage is in the fully retracted position, the drive carriage 13 is positioned near the support bracket 23. When the drive carriage 13 is in the fully extended position, the drive carriage 13 is at the end of the frame 12 nearest the pipe 15.

Figure 3:
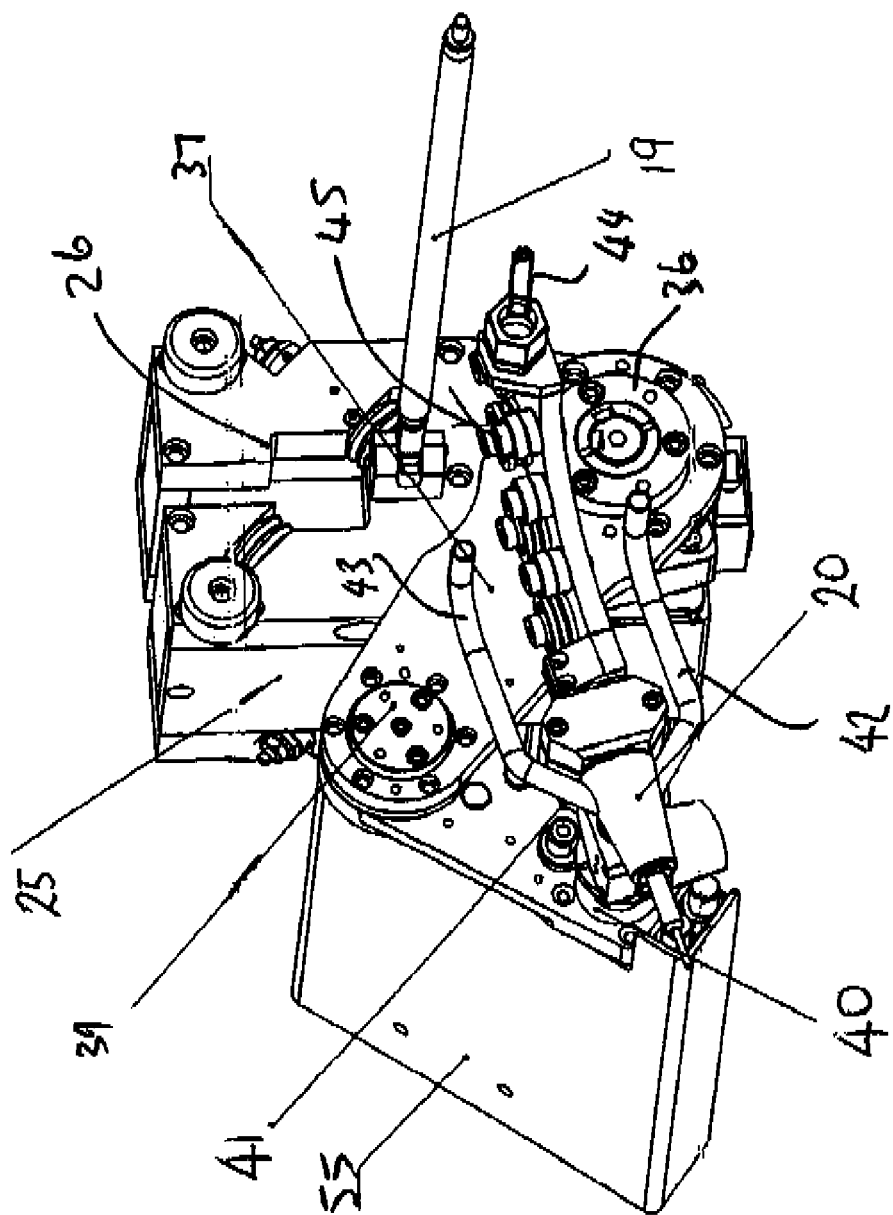
FIG. 3 is an isometric view of a welding carriage of the present invention removed from the support track.
Figure 4:
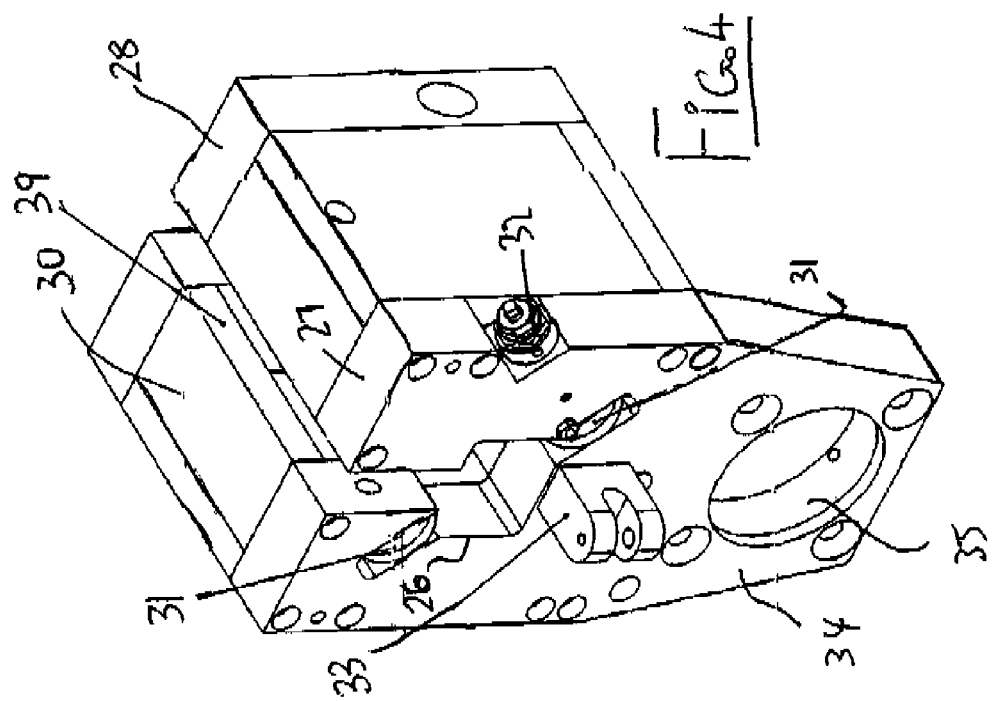
FIG. 4 is an isometric view of the base frame of the welding carriage of the present invention removed from the support track and with the welding and drive components removed.

Turning now to FIGS. 3, 4 and 5 there is shown more detail of the operating carriage 17. This comprises a main frame 25 which is generally rectangular with a front plate 27 and a rear plate 28 and includes a square opening 26 through the frame to receive the square support rod 14. Above the opening 26 is a slot 29 which passes though a top plate 30. This slot is narrower than the opening 26 and is provided to allow the frame to pass by one or more straps which support the rod 14 and extend from that rod to the wall of the pipe.

The frame is carried on the support rod by guide wheels 31 which co-operate with the corners of the rod. Thus the guide wheels are arranged at the corners of the opening 26 and extend diagonally outwardly therefrom. Each guide wheel has a V-shaped groove to engage its respective corner. Two diagonally opposed ones of the guide wheels are arranged at the front plate 27 and the other two at the rear plate 28. The guide wheels are idlers. The guide wheels are carried in bearings 32 mounted in the end plates of the frame. One of each pair of wheels is to spring mounted so as to be pressed inwardly toward its opposed wheel to provide a firm grip on the rod to accurately locate the frame on the rod. This prevents rotation of the frame around the rod since it is accurately located by the V-grooves.

Each tie rod 19 co-operates with a clevis 33 attached to the end plates of the frame.

The front plate 27 includes a depending portion 34 which extends below the frame underneath the rod 14 and which provides a circular receptacle 35 for a first servo-motor 36 carried on the frame. This motor defines an axis parallel to the rod 14 and acts to drive a first arm 37 of the three axis arm system supporting the coating head 20. Thus the system includes the servo-motor 36 acting as a shoulder axis, a second servo-motor 39 acting as an elbow axis and a third servo-motor 40 acting as a wrist axis. These co-operate with the arm 37 and a second arm 41, with the head 20 carried on the third servo-motor to define the three axis system.

The welding head is a water cooled head of commercially available type. This is supplied with electrical current through conductors defining a positive supply line 42 and/or 43. Welding rod supplying the coating material 44 is carried by a feeder 45.

These supply lines are strung over the intermediate carriages to be carried thereby. The conductors 42 and 43 are simply draped over suitable supports. The welding rod or wire is fed through a liner which allows it to be carried from a supply at the drive carriage on the frame at a required controlled rate to the feeder 45.

The feeder 45 is shown in more detail in FIG. 6 and includes an arcuate frame 46 which curves around from the torch or coating head 20 which projects radially outwardly from the axis of the pipe to the liner 47 which extends axially of the pipe. The liner is attached to a swivel head 48. The torch or coating head 20 is carried on a phenolic isolating mount surface 50 on the frame 46. As the welding wire emerges from the liner 47 at the swivel head 48 it is guided around the arcuate frame 46 by inner guide wheels 51 and outer guide wheels 52. In this way friction and wear at the arcuate guide is reduced.

A heat shield 55 is provided at the arm 41 to prevent heat and debris from the welding action from reaching the control system and control cables on the carriage and extending from the carriage to the support carriage 18 in front of the operating carriage.

Figure 7:
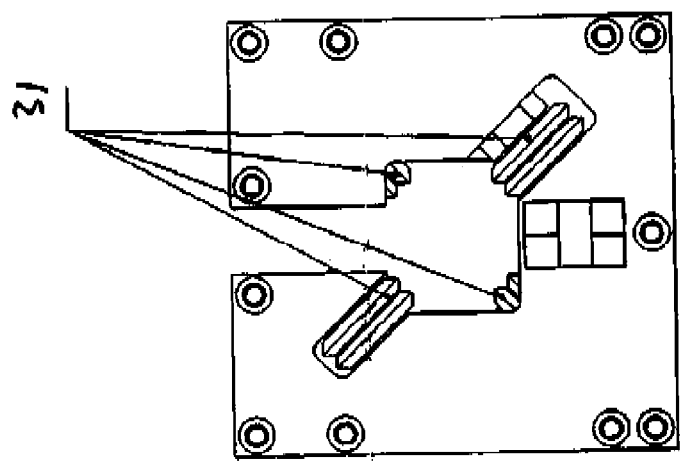
FIG. 7 is an isometric view of an intermediate carriage of the apparatus of FIG. 1.
Figure 8:
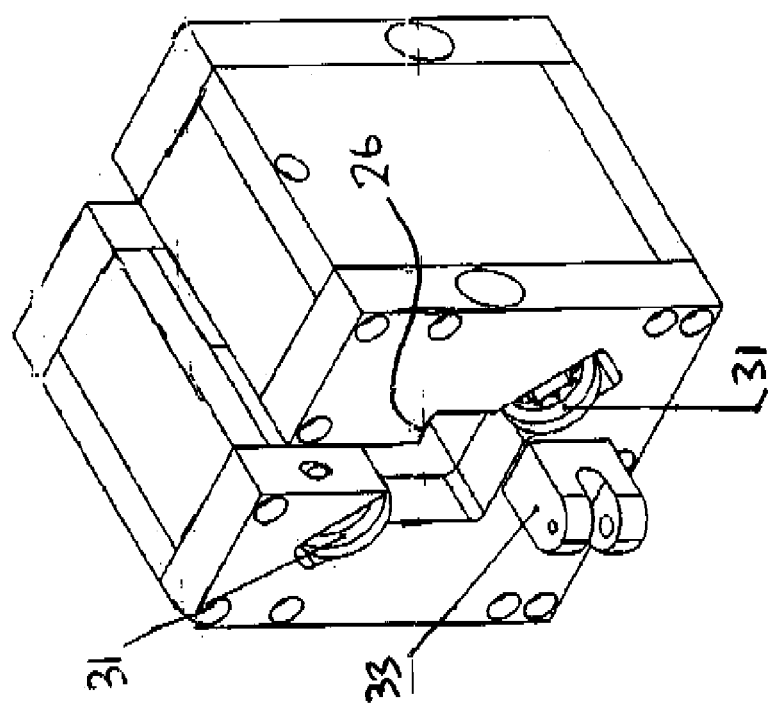
FIG. 8 is front elevational view of the intermediate carriage of the apparatus of FIG. 7.

In FIGS. 7 and 8 is shown the basic structure of the intermediate carriages and the drive carriage which are substantially identical to the operating carriage in that they include a similar rectangular frame with the opening 26 and the slot 29 locating the guide wheels 31.

The welding head is supported symmetrically so that is provides the ability to weld on each side of the pipe without the need to remove and reattach the torch that will allow for increased cycle times and versatility. The torch is liquid cooled and the heat shield 55 is provided to cover the support bar from weld splatter.

The arrangement provides a four axis welding head positioning system. The design includes a carriage that rides along a support rod and supports a three axis manipulator arm. The arm will allow for precise positioning of the welding head along the weld path at any position within the lower 180 degrees of the pipe. After this the pipe is inverted to weld the top half.

As shown in FIG. 2, the system is PLC controlled using a controller and a control unit C carried on the carriage 17. The system detects the welding parameters from the welder and can be used to control the welder. Thus the system is therefore able to program in all welding parameters including wire feed speed, amperage, arc voltage, torch travel speed, electrical stick-out distance and bead overlap. The electrical stick-out distance is controlled by operating the servo-motors to move the welding head relative to the frame to a required position based upon a detected parameter of the welding process. Thus it will maintain a preset electrical stick-out regardless of the base material or pipe profile. The pipes are notorious for out-of-roundness, and stick-out settings require to be continually adjusted as the carriage is moved along the pipe. This machine will do it automatically. The bead overlap is adjusted by changing the angle of rotation effected by the arms on the torch at the end of each stroke of the welding action.

The system can also be used to program in a number of alarm conditions including loss of arc, loss of carriage travel, over travel on all axes and emergency stop.

In addition the system can be used to program the welding head angle of attack to the weld bead. This can be changed relative to the radial direction of the axis of the pipe in the radial plane of the axis by changing the angle around the "wrist" axis particularly as the torch approaches the 3 o'clock and 9 o'clock positions. The angle of attack is the angle of the torch relative to the work in the radial direction. At the 6 o'clock position, the angle of attack is approximately 5-8 degrees relative to the radial direction, that is, the welding head is angled into the toe of the previous weld bead. As the application of further beads progresses upwards to the horizontal position, for example 4 o'clock, the angle of attack is increased in order to build a shelf to prevent the molten puddle from dripping.

Welding in both directions of travel is the ideal solution to increase cycle time and the system may have this ability. The system uses a tie-rod cart system which may include the ability to rapidly return to the starting position for improved cycle times if two directional welding is not feasible in general or applicable to a particular job.

The carriages ride on the corners of the bar and not on the flats of the bar to produce a more stable carriage with good acceptance for tracking around bends.

The support rod 14 is supported on one or more straps 14A along its length extending from the bar to the inside surface of the pipe to help combat the issues associated with the droop of the bar. By supporting the support rod on the straps, the droop can be eliminated, and the moment effects created by larger bend radius pipes are eliminated. The oscillatory effects are also significantly reduced with the addition of the strap support as the free length of the bar is reduced and the system is stiffened.

The support strap or straps can simply be tack welded to the support rod and to the top of the pipe provided that the pipe is large enough to facilitate a manual welder. The carriage has the slot 29 to incorporate clearance for this support strap to pass as the welding assembly passes. In situations where a manual tack joint is not possible an alternate method may be required.

The four axis manipulator arm ensures that any complications that may arise from the support rod misalignment or out of round pipe can be easily corrected through automatic adjustment of the welding head. The arm is adjusted by detecting the weld parameters primarily the current draw which indicates the distance of the welding head tip from the pipe surface.

The arrangement described herein provides a four axis welding head manipulator arm able to dynamically adjust the welding head position and thus maintain proper stick-out parameters despite variations in pipe diameter along the direction of travel. System stick-out is monitored in real time in order to provide adequate feedback to the manipulator arm to allow it to adjust accordingly. A number of options are available to monitor stick-out, including optics, laser scanning and weld voltage or current monitoring.

Considering the long distances that wire needs to be drawn from, the wire feeder 45 is located as close to the welding head as possible. This proximity will be limited by the feeder weight and packaged size if it is to ride on the portion of the carriage that enters the pipe.

With this proposed design the range of motion is limited making it necessary to use different upper arms of different lengths to accommodate the entire range of pipe diameters that the machine must be able to work with. Three different length arms are interchangeable in a manner that will allow for a fast, accurate, and repeatable swap of components. One arm will be used for pipes with inside diameters between 17 and 27 inches. Another will be used for pipes with inside diameters ranging from 27 to 37 inches and the final arm for pipes with inside diameters between 37 and 47 inches. The placement of the support rod within each varying size of pipe is arranged to center the shoulder pivot point in the center of the pipe to allow for smooth, easy, and accurate angular placement of the welding head. This is achieved by using different lengths of the straps 14A for different pipe diameters.

This opening 26 and the slot 29 are sealed through the use of brushes (not shown) along the sides to engage the rod 14 and to allow the incorporation of some positive air pressure to help combat contamination of the rolling elements.

One viable method for weld tracking is the use of a vision system. With appropriate filters the system can track and plot the weld path in real time. If multiple lines of sight are incorporated into the design, stick-out measurement may be possible as well. The use of fibre optic lenses provides for a light weight and relatively small travelling assembly allowing for a smaller and compact overall design.

Another methodology is to use a laser profile scanner to track the weld. Again this method provides adequate detail to track and plot the weld path in real time. A laser scanner will also easily provide stick-out measurements as well as allowing for full control of the manipulator arm. Scanners do tend to be slightly more bulky than optics but the required space and mass properties can be accommodated for in the design.

Real time welder control during the weld cycle is possible through communication options such as ArcNet, Ethernet or equivalent. Communication protocols are usually available in most robotic rated power sources, and usually come with a remote pendant for programming. This option also includes display of wire speed, current, voltage, and electrical stick-out on the main operator's interface panel.

Full robotic control of the welder can also be used to add a large degree of flexibility to the design; with tight stick-out control, full robotic control of welding parameters, Control of the automated pipe elbow welding machine with four axis manipulator arm uses an industrial rated motion controller with Human to Machine Interface (HMI). The HMI allows for operator entered data to be stored and recalled as necessary, to include items such as: welding parameters, if a robotic welder is selected, welding speed, start and finish locations, index size, position data, and others as required.

Operators also have local control of the torch head by use of a pendant station. This station can be located at the tailstock of the machine and provide for some degree of movement to enable easy and fast adjustments of the machine is while away from the actual HMI.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. An apparatus for coating an interior surface of a pipe comprising:

the pipe having an exterior surface, an interior surface and a curved longitudinal axis extending between two ends;

the pipe having distortions from a cylindrical shape so that a radial distance of the interior surface from the longitudinal axis varies at positions along the pipe;

an elongate support member extending continuously along the interior of the pipe between the two ends and which is curved along its length to follow the longitudinal axis of the pipe;

a series of spacer straps each attached between the interior surface of the pipe and the elongate support member at spaced positions therealong for supporting the elongate support member within the pipe;

the spacer straps being arranged so that the elongate support member is supported within the pipe at a position spaced from the interior surface and parallel to and above the longitudinal axis;

an operating carriage mounted on the elongate support member for movement therealong;

the elongate support member and the operating carriage having cooperating elements which maintain the operating carriage at a fixed rotational orientation relative to said elongate support member;

the elongate support member and the operating carriage being arranged so that the operating carriage runs along the elongate support member and passes the spacer straps;

an electric welding head arranged to apply parallel beads of welding material onto the interior surface of pipe to apply a coating covering the interior surface of the pipe;

a head drive system carried by the operating carriage for moving the electric welding head relative to the operating carriage in directions both angularly around and radially of the elongate support member; and a carriage drive system for driving the operating carriage longitudinally along said elongate support member;

wherein the head drive system comprises a multi-axis robotic arm able to dynamically adjust the electric welding head relative to the operating carriage both angularly and radially;

wherein the multi-axis robotic arm comprises a three parallel axis system including a shoulder axis connected to the carriage, an elbow axis and a wrist axis connected to the electric welding head with a pair of arms between the shoulder axis and the elbow axis and between the elbow axis and the wrist axis;

and wherein the multi-axis robotic arm is arranged with the shoulder axis at the center of the pipe on the longitudinal axis of the pipe.

2. The apparatus according to claim 1 wherein the head drive system is PLC controlled.

3. The apparatus according to claim 1 wherein a pull-type wire feeder is fixed just behind the head, and therefore translates along the elongate support member with the head into the pipe thus minimizing the distance over which the wire is pushed to the head.

4. The apparatus according to claim 1 wherein the wire feeder includes roller wire guides at the angle transition between the head which extends radially and an axially extending liner.

5. The apparatus according to claim 1 wherein the electrical welding head and the head drive system maintains a preset electrical stick-out of the welding head relative to the interior surface as the radial distance of the interior surface from the longitudinal axis varies.

6. The apparatus according to claim 5 wherein the head drive system maintains the preset electrical stick-out by detecting variations in welding parameters.

7. The apparatus according to claim 1 wherein the elongate support member comprises a support rod which is rectangular in cross-section to define corners and the operating carriage includes at least four guide wheels supporting the operating carriage on the corners of the support rod and wherein each guide wheel has a V shaped groove for receiving a respective one of the corners therein.

8. The apparatus according to claim 7 wherein the guide wheels are arranged in opposed pairs with each pair being arranged respectively at a front and rear of the operating carriage.

9. An apparatus for coating an interior surface of a pipe comprising:

the pipe having an exterior surface, an interior surface and a curved longitudinal axis extending between two ends;

the pipe having distortions from a cylindrical shape so that a radial distance of the interior surface from the longitudinal axis varies at positions along the pipe;

an elongate support member extending continuously along the interior of the pipe between the two ends and which is curved along its length to follow the longitudinal axis of the pipe; a series of spacer straps each attached between the interior surface of the pipe and the elongate support member at spaced positions therealong for supporting the elongate support member within the pipe; the spacer straps being arranged so that the elongate support member is supported within the pipe at a position spaced from the interior surface and parallel to and above the longitudinal axis;

an operating carriage mounted on the elongate support member for movement therealong;

the elongate support member and the operating carriage having cooperating elements which maintain the operating carriage at a fixed rotational orientation relative to said elongate support member;

an electric welding head for coating the interior surface of the pipe from a supply of a coating material;

a head drive system carried by the operating carriage for moving the electric welding head relative to the operating carriage in directions both angularly around and radially of the elongate support member; and a carriage drive system for driving the operating carriage longitudinally along said elongate support member;

wherein the head is an electrical welding head arranged to apply parallel beads of welding material onto the interior surface of the pipe to apply a coating covering the interior surface of the pipe;

and wherein the head drive system maintains a preset electrical stick-out relative to the pipe surface as the radial distance of the interior surface from the longitudinal axis of the pipe varies.

10. The apparatus according to claim 9 wherein the head drive system maintains a preset electrical stick-out by detecting variations in welding parameters.

11. An apparatus for coating an interior surface of a pipe comprising:

the pipe having an exterior surface, an interior surface and a curved longitudinal axis extending between two ends;

the pipe having distortions from a cylindrical shape so that a radial distance of the interior surface from the longitudinal axis varies at positions along the pipe;

an elongate support member extending continuously along the interior of the pipe between the two ends and which is curved along its length to follow the longitudinal axis of the pipe;

a series of spacer straps each attached between the interior surface of the pipe and the elongate support member at spaced positions therealong for supporting the elongate support member within the pipe;

the spacer straps being arranged so that the elongate support member is supported within the pipe at a position spaced from the interior surface and parallel to and above the longitudinal axis;

an operating carriage mounted on the elongate support member for movement therealong;

the elongate support member and the operating carriage having co-operating elements which maintain the operating carriage at a fixed rotational orientation relative to said elongate support member;

the elongate support member and the operating carriage being arranged so that the operating carriage runs along the elongate support member and passes the spacer straps;

an electric welding head for coating the interior surface of the pipe from a supply of a coating material;

a head drive system carried by the operating carriage for moving the electric welding head relative to the operating carriage in directions both angularly around and radially of the elongate support member; and a carriage drive system for driving the operating carriage longitudinally along said elongate support member.

12. The apparatus according to claim 11 wherein the elongate support member comprises a support rod which is rectangular in cross-section to define corners and the operating carriage includes at least four guide wheels supporting the operating carriage on the corners of the support rod and wherein each guide wheel has a V shaped groove for receiving a respective one of the corners therein.

13. The apparatus according to claim 12 wherein the guide wheels are arranged in opposed pairs with each pair being arranged respectively at a front and rear of the operating carriage.

14. An apparatus for coating an interior surface of a pipe, said apparatus comprising:

an elongate support member extending along the interior of the pipe parallel to a longitudinal axis of the pipe; a series of spacer straps each attached between the interior surface of the pipe and the elongate support member at spaced positions therealong for supporting the elongate support member within the pipe; the spacer straps being arranged so that the elongate support member is supported within the pipe at a position spaced from the interior surface and parallel to and above the longitudinal axis;

an operating carriage mounted on the elongate support member for movement therealong;

the elongate support member and the operating carriage having cooperating elements which maintain the operating carriage at a fixed rotational orientation relative to said elongate support member;

an electric welding head for coating the interior surface of the pipe from a supply of a coating material;

a head drive system carried by the operating carriage for moving the electric welding head relative to the operating carriage in directions both angularly around and radially of the elongate support member; and a carriage drive system for driving the operating carriage longitudinally along said elongate support member;

wherein electrical welding head is arranged to apply parallel beads of welding material onto the interior surface of the pipe to apply a coating covering the interior surface of the pipe;

and wherein a pull-type wire feeder is fixed just behind the electric welding head, and therefore translates along the elongate support member with the electric welding head into the pipe thus minimizing the distance over which the wire is pushed to the electric welding head.

15. The apparatus according to claim 14 wherein the wire feeder includes roller wire guides at the angle transition between the head which extends radially and an axially extending liner.

16. An apparatus for coating an interior surface of a pipe, comprising:

the pipe having an exterior surface, an interior surface and a curved longitudinal axis extending between two ends;

an elongate support member extending continuously along the interior of the pipe between the two ends and which is curved along its length to follow the longitudinal axis of the pipe;

a series of spacer straps each attached between the interior surface of the pipe and the elongate support member at spaced positions therealong for supporting the elongate support member within the pipe;

the spacer straps being arranged so that the elongate support member is supported within the pipe at a position spaced from the interior surface and parallel to and above the longitudinal axis;

an operating carriage mounted on the elongate support member for movement therealong;

the elongate support member and the operating carriage having cooperating elements which maintain the operating carriage at a fixed rotational orientation relative to said elongate support member;

the elongate support member and the operating carriage being arranged so that the operating carriage runs along the elongate support member and passes the spacer straps;

an electric welding head for coating the interior surface of the pipe from a supply of a coating material;

a head drive system carried by the operating carriage for moving the electric welding head relative to the operating carriage in directions both angularly around and radially of the elongate support member; and a carriage drive system for driving the operating carriage longitudinally along said elongate support member;

wherein the elongate support member comprises a support rod which is rectangular in cross-section to define corners and the operating carriage includes at least four guide wheels supporting the operating carriage on the corners of the support rod;

wherein each guide wheel has a V shaped groove for receiving a respective one of the corners therein;

wherein the guide wheels are arranged in opposed pairs with each pair being arranged respectively at a front and rear of the operating carriage;

and wherein at least one of each pair of guide wheels is spring mounted so as to be pressed inwardly toward the corner of the rod.

* * * * *